(12) United States Patent
Miller (10) Patent No.: US 9,215,749 B2
(45) Date of Patent: Dec. 15, 2015

(54) REDUCING AN ACOUSTIC INTENSITY VECTOR WITH ADAPTIVE NOISE CANCELLATION WITH TWO ERROR MICROPHONES

(71) Applicant: Cirrus Logic, Inc., Austin, TX (US)

(72) Inventor: Antonio John Miller, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 317 days.

(21) Appl. No.: 13/828,823

(22) Filed: Mar. 14, 2013

(65) Prior Publication Data

US 2014/0274198 A1    Sep. 18, 2014

(51) Int. Cl.
*H04W 88/02*     (2009.01)
*G10K 11/178*    (2006.01)

(52) U.S. Cl.
CPC ........... *H04W 88/02* (2013.01); *G10K 11/1784* (2013.01); *G10K 2210/1081* (2013.01)

(58) Field of Classification Search
CPC .............. H04W 88/02; G10K 11/1788; G10K 11/1784; G10K 2210/1081
USPC ......... 381/71.1, 71.2, 71.3, 71.6, 71.7, 71.11, 381/71.12, 26, 57, 91, 92, 122; 455/550.1, 455/569.1, 570
See application file for complete search history.

(56) References Cited

U.S. PATENT DOCUMENTS

| | | | |
|---|---|---|---|
| 5,044,373 A | 9/1991 | Northeved et al. | |
| 5,251,263 A | 10/1993 | Andrea et al. | |
| 5,278,913 A | 1/1994 | Delfosse et al. | |
| 5,321,759 A | 6/1994 | Yuan | |
| 5,337,365 A | 8/1994 | Hamabe et al. | |
| 5,359,662 A | 10/1994 | Yuan et al. | |
| 5,410,605 A | 4/1995 | Sawada et al. | |

(Continued)

FOREIGN PATENT DOCUMENTS

| | | |
|---|---|---|
| DE | 102011013343 A1 | 9/2012 |
| EP | 1880699 A2 | 1/2008 |

(Continued)

OTHER PUBLICATIONS

Benet et al., Using infrared sensors for distance measurement in mobile roots, Robotics and Autonomous Systems, 2002, vol. 40, pp. 255-266.

(Continued)

*Primary Examiner* — Vivian Chin
*Assistant Examiner* — Jason R Kurr
(74) *Attorney, Agent, or Firm* — Norton Rose Fulbright US LLP (57) ABSTRACT

A second error microphone may be incorporated in a mobile device to allow computation of additional parameters for modifying an adaptive noise cancellation (ANC) algorithm. For example, a first and second acoustic pressure may be calculated from a first and second error microphone of the mobile device. The first and second acoustic pressure may be input to an algorithm for determining an acoustic intensity vector. The ANC algorithm may receive the acoustic intensity vector as an input, and adapt an anti-noise signal to reduce the acoustic intensity vector. Additionally, an input impedance for the error microphones may be calculated from the acoustic pressure to determine coupling between a speaker and a user's ear. The anti-noise algorithm may be adjusted or disabled when the input impedance indicates the user has removed the phone from the user's ear.

19 Claims, 9 Drawing Sheets

(56) References Cited

U.S. PATENT DOCUMENTS

| | | | |
|---|---|---|---|
| 5,425,105 A | 6/1995 | Lo et al. |
| 5,445,517 A | 8/1995 | Kondou et al. |
| 5,465,413 A | 11/1995 | Enge et al. |
| 5,548,681 A | 8/1996 | Gleaves et al. |
| 5,586,190 A | 12/1996 | Trantow et al. |
| 5,640,450 A | 6/1997 | Watanabe |
| 5,699,437 A | 12/1997 | Finn |
| 5,706,344 A | 1/1998 | Finn |
| 5,740,256 A | 4/1998 | Castello Da Costa et al. |
| 5,768,124 A | 6/1998 | Stothers et al. |
| 5,815,582 A | 9/1998 | Claybaugh et al. |
| 5,832,095 A | 11/1998 | Daniels |
| 5,946,391 A | 8/1999 | Dragwidge et al. |
| 5,991,418 A | 11/1999 | Kuo |
| 6,041,126 A | 3/2000 | Terai et al. |
| 6,118,878 A | 9/2000 | Jones |
| 6,192,133 B1* | 2/2001 | Enamito et al. ............ 381/71.5 |
| 6,219,427 B1 | 4/2001 | Kates et al. |
| 6,278,786 B1 | 8/2001 | McIntosh |
| 6,282,176 B1 | 8/2001 | Hemkumar |
| 6,418,228 B1 | 7/2002 | Terai et al. |
| 6,434,246 B1 | 8/2002 | Kates et al. |
| 6,434,247 B1 | 8/2002 | Kates et al. |
| 6,522,746 B1 | 2/2003 | Marchok et al. |
| 6,683,960 B1 | 1/2004 | Fujii et al. |
| 6,766,292 B1 | 7/2004 | Chandran et al. |
| 6,768,795 B2 | 7/2004 | Feltstrom et al. |
| 6,850,617 B1 | 2/2005 | Weigand |
| 6,940,982 B1 | 9/2005 | Watkins |
| 7,058,463 B1 | 6/2006 | Ruha et al. |
| 7,103,188 B1 | 9/2006 | Jones |
| 7,181,030 B2 | 2/2007 | Rasmussen et al. |
| 7,330,739 B2 | 2/2008 | Somayajula |
| 7,365,669 B1 | 4/2008 | Melanson |
| 7,616,767 B2* | 11/2009 | Geiger et al. ............ 381/57 |
| 7,680,456 B2 | 3/2010 | Muhammad et al. |
| 7,742,790 B2 | 6/2010 | Konchitsky et al. |
| 7,817,808 B2 | 10/2010 | Konchitsky et al. |
| 8,019,050 B2 | 9/2011 | Mactavish et al. |
| 8,189,429 B2* | 5/2012 | Chen et al. ............ 367/118 |
| D666,169 S | 8/2012 | Tucker et al. |
| 8,249,262 B2 | 8/2012 | Chua et al. |
| 8,251,903 B2 | 8/2012 | LeBoeuf et al. |
| 8,290,537 B2 | 10/2012 | Lee et al. |
| 8,325,934 B2 | 12/2012 | Kuo |
| 8,379,884 B2 | 2/2013 | Horibe et al. |
| 8,401,200 B2 | 3/2013 | Tiscareno et al. |
| 8,442,251 B2 | 5/2013 | Jensen et al. |
| 8,452,020 B2* | 5/2013 | Gregg et al. ............ 381/59 |
| 8,526,627 B2 | 9/2013 | Asao et al. |
| 8,744,425 B2* | 6/2014 | Miwa ............ 455/418 |
| 8,831,239 B2* | 9/2014 | Bakalos ............ 381/71.8 |
| 8,848,936 B2 | 9/2014 | Kwatra et al. |
| 8,907,829 B1 | 12/2014 | Naderi |
| 8,908,877 B2 | 12/2014 | Abdollahzadeh Milani et al. |
| 8,948,407 B2 | 2/2015 | Alderson et al. |
| 8,958,571 B2 | 2/2015 | Kwatra et al. |
| 2001/0053228 A1 | 12/2001 | Jones |
| 2002/0003887 A1 | 1/2002 | Zhang et al. |
| 2003/0063759 A1 | 4/2003 | Brennan et al. |
| 2003/0185403 A1 | 10/2003 | Sibbald |
| 2004/0047464 A1 | 3/2004 | Yu et al. |
| 2004/0165736 A1 | 8/2004 | Hetherington et al. |
| 2004/0167777 A1 | 8/2004 | Hetherington et al. |
| 2004/0202333 A1 | 10/2004 | Csermak et al. |
| 2004/0264706 A1 | 12/2004 | Ray et al. |
| 2005/0004796 A1 | 1/2005 | Trump et al. |
| 2005/0018862 A1 | 1/2005 | Fisher |
| 2005/0117754 A1 | 6/2005 | Sakawaki |
| 2005/0207585 A1 | 9/2005 | Christoph |
| 2005/0240401 A1 | 10/2005 | Ebenezer |
| 2006/0035593 A1 | 2/2006 | Leeds |
| 2006/0069556 A1 | 3/2006 | Nadjar et al. |
| 2006/0153400 A1 | 7/2006 | Fujita et al. |
| 2007/0030989 A1 | 2/2007 | Kates |
| 2007/0033029 A1 | 2/2007 | Sakawaki |
| 2007/0038441 A1 | 2/2007 | Inoue et al. |
| 2007/0047742 A1 | 3/2007 | Taenzer et al. |
| 2007/0053524 A1 | 3/2007 | Haulick et al. |
| 2007/0076896 A1 | 4/2007 | Hosaka et al. |
| 2007/0154031 A1 | 7/2007 | Avendano et al. |
| 2007/0258597 A1 | 11/2007 | Rasmussen et al. |
| 2007/0297620 A1 | 12/2007 | Choy |
| 2008/0019548 A1 | 1/2008 | Avendano |
| 2008/0101589 A1 | 5/2008 | Horowitz et al. |
| 2008/0107281 A1 | 5/2008 | Togami et al. |
| 2008/0144853 A1 | 6/2008 | Sommerfeldt et al. |
| 2008/0177532 A1 | 7/2008 | Greiss et al. |
| 2008/0181422 A1 | 7/2008 | Christoph |
| 2008/0226098 A1 | 9/2008 | Haulick et al. |
| 2008/0240455 A1 | 10/2008 | Inoue et al. |
| 2008/0240457 A1 | 10/2008 | Inoue et al. |
| 2009/0012783 A1 | 1/2009 | Klein |
| 2009/0034748 A1 | 2/2009 | Sibbald |
| 2009/0041260 A1 | 2/2009 | Jorgensen et al. |
| 2009/0046867 A1 | 2/2009 | Clemow |
| 2009/0060222 A1 | 3/2009 | Jeong et al. |
| 2009/0080670 A1 | 3/2009 | Solbeck et al. |
| 2009/0086990 A1 | 4/2009 | Christoph |
| 2009/0175466 A1 | 7/2009 | Elko et al. |
| 2009/0196429 A1 | 8/2009 | Ramakrishnan et al. |
| 2009/0220107 A1 | 9/2009 | Every et al. |
| 2009/0238369 A1 | 9/2009 | Ramakrishnan et al. |
| 2009/0245529 A1 | 10/2009 | Asada et al. |
| 2009/0254340 A1 | 10/2009 | Sun et al. |
| 2009/0290718 A1 | 11/2009 | Kahn et al. |
| 2009/0296965 A1 | 12/2009 | Kojima |
| 2009/0304200 A1 | 12/2009 | Kim et al. |
| 2009/0311979 A1 | 12/2009 | Husted et al. |
| 2010/0014683 A1 | 1/2010 | Maeda et al. |
| 2010/0014685 A1 | 1/2010 | Wurm |
| 2010/0061564 A1 | 3/2010 | Clemow et al. |
| 2010/0069114 A1 | 3/2010 | Lee et al. |
| 2010/0082339 A1 | 4/2010 | Konchitsky et al. |
| 2010/0098263 A1 | 4/2010 | Pan et al. |
| 2010/0098265 A1 | 4/2010 | Pan et al. |
| 2010/0124336 A1 | 5/2010 | Shridhar et al. |
| 2010/0124337 A1 | 5/2010 | Wertz et al. |
| 2010/0131269 A1 | 5/2010 | Park et al. |
| 2010/0150367 A1 | 6/2010 | Mizuno |
| 2010/0158330 A1 | 6/2010 | Guissin et al. |
| 2010/0166203 A1 | 7/2010 | Peissig et al. |
| 2010/0195838 A1* | 8/2010 | Bright ............ 381/57 |
| 2010/0195844 A1 | 8/2010 | Christoph et al. |
| 2010/0207317 A1 | 8/2010 | Iwami et al. |
| 2010/0239126 A1 | 9/2010 | Grafenberg et al. |
| 2010/0246855 A1 | 9/2010 | Chen |
| 2010/0266137 A1 | 10/2010 | Sibbald et al. |
| 2010/0272276 A1 | 10/2010 | Carreras et al. |
| 2010/0272283 A1 | 10/2010 | Carreras et al. |
| 2010/0274564 A1 | 10/2010 | Bakalos et al. |
| 2010/0284546 A1 | 11/2010 | DeBrunner et al. |
| 2010/0291891 A1 | 11/2010 | Ridgers et al. |
| 2010/0296666 A1 | 11/2010 | Lin |
| 2010/0296668 A1 | 11/2010 | Lee et al. |
| 2010/0310086 A1 | 12/2010 | Magrath et al. |
| 2010/0322430 A1 | 12/2010 | Isberg |
| 2011/0007907 A1 | 1/2011 | Park et al. |
| 2011/0106533 A1 | 5/2011 | Yu |
| 2011/0129098 A1 | 6/2011 | Delano et al. |
| 2011/0130176 A1 | 6/2011 | Magrath et al. |
| 2011/0142247 A1 | 6/2011 | Fellers et al. |
| 2011/0144984 A1 | 6/2011 | Konchitsky |
| 2011/0158419 A1 | 6/2011 | Theverapperuma et al. |
| 2011/0206214 A1 | 8/2011 | Christoph et al. |
| 2011/0222698 A1 | 9/2011 | Asao et al. |
| 2011/0249826 A1 | 10/2011 | Van Leest |
| 2011/0288860 A1 | 11/2011 | Schevciw et al. |
| 2011/0293103 A1 | 12/2011 | Park et al. |
| 2011/0299695 A1 | 12/2011 | Nicholson |
| 2011/0305347 A1 | 12/2011 | Wurm |
| 2011/0317848 A1 | 12/2011 | Ivanov et al. |
| 2012/0135787 A1 | 5/2012 | Kusunoki et al. |
| 2012/0140917 A1 | 6/2012 | Nicholson et al. |

(56) References Cited

U.S. PATENT DOCUMENTS

| | | |
|---|---|---|
| 2012/0140942 A1 | 6/2012 | Loeda |
| 2012/0140943 A1 | 6/2012 | Hendrix et al. |
| 2012/0148062 A1 | 6/2012 | Scarlett et al. |
| 2012/0155666 A1 | 6/2012 | Nair |
| 2012/0170766 A1 | 7/2012 | Alves et al. |
| 2012/0207317 A1 | 8/2012 | Abdollahzadeh Milani et al. |
| 2012/0215519 A1 | 8/2012 | Park et al. |
| 2012/0250873 A1 | 10/2012 | Bakalos et al. |
| 2012/0259626 A1 | 10/2012 | Li et al. |
| 2012/0263317 A1 | 10/2012 | Shin et al. |
| 2012/0281850 A1 | 11/2012 | Hyatt |
| 2012/0300958 A1 | 11/2012 | Klemmensen |
| 2012/0300960 A1 | 11/2012 | Mackay et al. |
| 2012/0308021 A1 | 12/2012 | Kwatra et al. |
| 2012/0308024 A1 | 12/2012 | Alderson et al. |
| 2012/0308025 A1 | 12/2012 | Hendrix et al. |
| 2012/0308026 A1 | 12/2012 | Kamath et al. |
| 2012/0308027 A1 | 12/2012 | Kwatra |
| 2012/0308028 A1 | 12/2012 | Kwatra et al. |
| 2012/0310640 A1 | 12/2012 | Kwatra et al. |
| 2013/0010982 A1 | 1/2013 | Elko et al. |
| 2013/0083939 A1 | 4/2013 | Fellers et al. |
| 2013/0243198 A1 | 9/2013 | Van Rumpt |
| 2013/0243225 A1 | 9/2013 | Yokota |
| 2013/0272539 A1 | 10/2013 | Kim et al. |
| 2013/0287218 A1 | 10/2013 | Alderson et al. |
| 2013/0287219 A1 | 10/2013 | Hendrix et al. |
| 2013/0301842 A1 | 11/2013 | Hendrix et al. |
| 2013/0301846 A1 | 11/2013 | Alderson et al. |
| 2013/0301847 A1 | 11/2013 | Alderson et al. |
| 2013/0301848 A1 | 11/2013 | Zhou et al. |
| 2013/0301849 A1 | 11/2013 | Alderson et al. |
| 2013/0343556 A1 | 12/2013 | Bright |
| 2013/0343571 A1 | 12/2013 | Rayala et al. |
| 2014/0044275 A1 | 2/2014 | Goldstein et al. |
| 2014/0050332 A1 | 2/2014 | Nielsen et al. |
| 2014/0086425 A1 | 3/2014 | Jensen et al. |
| 2014/0177851 A1 | 6/2014 | Kitazawa et al. |
| 2014/0211953 A1 | 7/2014 | Alderson et al. |
| 2014/0270222 A1 | 9/2014 | Hendrix et al. |
| 2014/0270223 A1 | 9/2014 | Li et al. |
| 2014/0270224 A1 | 9/2014 | Zhou et al. |
| 2015/0092953 A1 | 4/2015 | Abdollahzadeh Milani et al. |
| 2015/0104032 A1 | 4/2015 | Kwatra et al. |

FOREIGN PATENT DOCUMENTS

| | | |
|---|---|---|
| EP | 1947642 A1 | 7/2008 |
| EP | 2133866 A1 | 12/2009 |
| EP | 2216774 A1 | 8/2010 |
| EP | 2395500 A1 | 12/2011 |
| EP | 2395501 A1 | 12/2011 |
| GB | 2401744 A | 11/2004 |
| GB | 2455821 A | 6/2009 |
| GB | 2455824 A | 6/2009 |
| GB | 2455828 A | 6/2009 |
| GB | 2484722 A | 4/2012 |
| JP | H06186985 A | 7/1994 |
| WO | 03015074 A1 | 2/2003 |
| WO | 03015275 A1 | 2/2003 |
| WO | 2004009007 A1 | 1/2004 |
| WO | 2004017303 A1 | 2/2004 |
| WO | 2007/007916 A1 | 1/2007 |
| WO | 2007/113487 A1 | 10/2007 |
| WO | 2010/117714 A1 | 10/2010 |
| WO | 2012/134874 A1 | 10/2012 |

OTHER PUBLICATIONS

Campbell, Mikey, "Apple looking into self-adjusting earbud headphones with noise cancellation tech", Apple Insider, Jul. 4, 2013, pp. 1-10 (10 pages in pdf), downloaded on May 14, 2014 from http://appleinsider.com/articles/13/07/04/apple-looking-into-self-adjusting-earbud-headphones-with-noise-cancellation-tech.

Pfann, et al., "LMS Adaptive Filtering with Delta-Sigma Modulated Input Signals," IEEE Signal Processing Letters, Apr. 1998, pp. 95-97, vol. 5, No. 4, IEEE Press, Piscataway, NJ.

Toochinda, et al. "A Single-Input Two-Output Feedback Formulation for ANC Problems," Proceedings of the 2001 American Control Conference, Jun. 2001, pp. 923-928, vol. 2, Arlington, VA.

Kuo, et al., "Active Noise Control: A Tutorial Review," Proceedings of the IEEE, Jun. 1999, pp. 943-973, vol. 87, No. 6, IEEE Press, Piscataway, NJ.

Johns, et al., "Continuous-Time LMS Adaptive Recursive Filters," IEEE Transactions on Circuits and Systems, Jul. 1991, pp. 769-778, vol. 38, No. 7, IEEE Press, Piscataway, NJ.

Shoval, et al., "Comparison of DC Offset Effects in Four LMS Adaptive Algorithms," IEEE Transactions on Circuits and Systems II: Analog and Digital Processing, Mar. 1995, PP. 176-185, vol. 42, Issue 3, IEEE Press, Piscataway, NJ.

Mali, Dilip, "Comparison of DC Offset Effects on LMS Algorithm and its Derivatives," International Journal of Recent Trends in Engineering, May 2009, pp. 323-328, vol. 1, No. 1, Academy Publisher.

Kates, James M., "Principles of Digital Dynamic Range Compression," Trends in Amplification, Spring 2005, pp. 45-76, vol. 9, No. 2, Sage Publications.

Gao, et al., "Adaptive Linearization of a Loudspeaker," IEEE International Conference on Acoustics, Speech, and Signal Processing, Apr. 14-17, 1991, pp. 3589-3592, Toronto, Ontario, CA.

Silva, et al., "Convex Combination of Adaptive Filters With Different Tracking Capabilities," IEEE International Conference on Acoustics, Speech, and Signal Processing, Apr. 15-20, 2007, pp. III 925-928, vol. 3, Honolulu, HI, USA.

Akhtar, et al., "A Method for Online Secondary Path Modeling in Active Noise Control Systems," IEEE International Symposium on Circuits and Systems, May 23-26, 2005, pp. 264-267, vol. 1, Kobe, Japan.

Davari, et al., "A New Online Secondary Path Modeling Method for Feedforward Active Noise Control Systems," IEEE International Conference on Industrial Technology, Apr. 21-24, 2008, pp. 1-6, Chengdu, China.

Lan, et al., "An Active Noise Control System Using Online Secondary Path Modeling With Reduced Auxiliary Noise," IEEE Signal Processing Letters, Jan. 2002, pp. 16-18, vol. 9, Issue 1, IEEE Press, Piscataway, NJ.

Liu, et al., "Analysis of Online Secondary Path Modeling With Auxiliary Noise Scaled by Residual Noise Signal," IEEE Transactions on Audio, Speech and Language Processing, Nov. 2010, pp. 1978-1993, vol. 18, Issue 8, IEEE Press, Piscataway, NJ.

Black, John W., "An Application of Side-Tone in Subjective Tests of Microphones and Headsets", Project Report No. NM 001 064.01.20, Research Report of the U.S. Naval School of Aviation Medicine, Feb. 1, 1954, 12 pages (pp. 1-12 in pdf), Pensacola, FL, US.

Peters, Robert W., "The Effect of High-Pass and Low-Pass Filtering of Side-Tone Upon Speaker Intelligibility", Project Report No. NM 001 064.01.25, Research Report of the U.S. Naval School of Aviation Medicine, Aug. 16, 1954, 13 pages (pp. 1-13 in pdf), Pensacola, FL, US.

Lane, et al., "Voice Level: Autophonic Scale, Perceived Loudness, and the Effects of Sidetone", The Journal of the Acoustical Society of America, Feb. 1961, pp. 160-167, vol. 33, No. 2., Cambridge, MA, US.

Liu, et al., "Compensatory Responses to Loudness-shifted Voice Feedback During Production of Mandarin Speech", Journal of the Acoustical Society of America, Oct. 2007, pp. 2405-2412, vol. 122, No. 4.

Paepcke, et al., "Yelling in the Hall: Using Sidetone to Address a Problem with Mobile Remote Presence Systems", Symposium on User Interface Software and Technology, Oct. 16-19, 2011, 10 pages (pp. 1-10 in pdf), Santa Barbara, CA, US.

Therrien, et al., "Sensory Attenuation of Self-Produced Feedback: The Lombard Effect Revisited", PLOS ONE, Nov. 2012, pp. 1-7, vol. 7, Issue 11, e49370, Ontario, Canada.

Abdollahzadeh Milani, et al., "On Maximum Achievable Noise Reduction in ANC Systems",2010 IEEE International Conference on Acoustics Speech and Signal Processing, Mar. 14-19, 2010, pp. 349-352, Dallas, TX, US.

(56) References Cited

OTHER PUBLICATIONS

Cohen, Israel, "Noise Spectrum Estimation in Adverse Environments: Improved Minima Controlled Recursive Averaging", IEEE Transactions on Speech and Audio Processing, Sep. 2003, pp. 1-11, vol. 11, Issue 5, Piscataway, NJ, US.
Ryan, et al., "Optimum Near-Field Performance of Microphone Arrays Subject to a Far-Field Beampattern Constraint", J. Acoust. Soc. Am., Nov. 2000, pp. 2248-2255, 108 (5), Pt. 1, Ottawa, Ontario, Canada.
Cohen, et al., "Noise Estimation by Minima Controlled Recursive Averaging for Robust Speech Enhancement", IEEE Signal Processing Letters, Jan. 2002, pp. 12-15, vol. 9, No. 1, Piscataway, NJ, US.
Martin, Rainer, "Noise Power Spectral Density Estimation Based on Optimal Smoothing and Minimum Statistics", IEEE Transactions on Speech and Audio Processing, Jul. 2001, pp. 504-512, vol. 9, No. 5, Piscataway, NJ, US.
Martin, Rainer, "Spectral Subtraction Based on Minimum Statistics", Signal Processing VII Theories and Applications, Proceedings of EUSIPCO-94, 7th European Signal Processing Conference, Sep. 13-16, 1994, pp. 1182-1185, vol. III, Edinburgh, Scotland, U.K.
Booij, et al., "Virtual sensors for local, three dimensional, broadband multiple-channel active noise control and the.effects on the quiet zones", Proceedings of the International Conference on Noise and Vibration Engineering, ISMA 2010, Sep. 20-22, 2010, pp. 151-166, Leuven.
Kuo, et al., "Residual noise shaping technique for active noise control systems", J. Acoust. Soc. Am. 95 (3), Mar. 1994, pp. 1665-1668.
Lopez-Caudana, Edgar Omar, "Active Noise Cancellation: The Unwanted Signal and The Hybrid Solution", Adaptive Filtering Applications, Dr. Lino Garcia (Ed.), Jul. 2011, pp. 89-84, ISBN: 978-953-307-306-4, In Tech.
Senderowicz, et al., "Low-Voltage Double-Sampled Delta-Sigma Converters", IEEE Journal on Solid-State Circuits, Dec. 1997, pp. 1907-1919, vol. 32, No. 12, Piscataway, NJ.
Hurst, et al., "An improved double sampling scheme for switched-capacitor delta-sigma modulators", 1992 IEEE Int. Symp. on Circuits and Systems, May 10-13, 1992, vol. 3, pp, 1179-1182, San Diego, CA.
U.S. Appl. No. 14/101,777, Alderson et al.
U.S. Appl. No. 14/101,955, Alderson.
U.S. Appl. No. 13/896,526, Naderi.
U.S. Appl. No. 13/924,935, Hellman.
U.S. Appl. No. 13/968,013, Abdollahzadeh Milani et al.
U.S. Appl. No. 14/252,235, Lu et al.
U.S. Appl. No. 13/724,656, Lu et al.
U.S. Appl. No. 13/721,832, Lu et al.
U.S. Appl. No. 13/762,504, Abdollahzadeh Milani et al.
U.S. Appl. No. 14/210,537, Abdollahzadeh Milani et al.
U.S. Appl. No. 14/210,589, Abdollahzadeh Milani et al.
U.S. Appl. No. 14/228,322, Alderson et al.
U.S. Appl. No. 14/197,814, Kaller et al.
U.S. Appl. No. 14/029,159, Li et al.
U.S. Appl. No. 14/062,951, Zhou et al.
U.S. Appl. No. 13/968,007, Hendrix et al.
U.S. Appl. No. 13/794,931, Lu et al.
U.S. Appl. No. 13/794.979, Alderson et al.
U.S. Appl. No. 13/686,353, Hendrix et al.
Parkins, John W., "Narrowband and broadband active control in an enclosure using the acoustic energy density", Acoustical Society of America, Jul. 2000, vol. 108, No. 1, pp. 192-203.
Jin, et al. "A simultaneous equation method-based online secondary path modeling algorithm for active noise control", Journal of Sound and Vibration, Apr. 25, 2007, pp. 455-474, vol. 303, No. 3-5, London, GB.
Erkelens, et al., "Tracking of Nonstationary Noise Based on Data-Driven Recursive Noise Power Estimation", IEEE Transactions on Audio Speech and Language Processing, Aug. 2008, pp. 1112-1123, vol. 16, No. 6, Piscataway, NJ, US.
Rao, et al., "A Novel Two State Single Channel Speech Enhancement Technique", India Conference (INDICON) 2011 Annual IEEE, IEEE, Dec. 2011, 6 pages (pp. 1-6 in pdf), Piscataway, NJ, US.
Rangachari, et al., "A noise-estimation algorithm for highly non-stationary environments", Speech Communication, Feb. 2006, pp. 220-231, vol. 48, No. 2. Elsevier Science Publishers.
Parkins, et al., "Narrowband and broadband active control in an enclosure using the acoustic energy density", J. Acoust. Soc. Am. Jul. 2000, pp. 192-203, vol. 108, issue 1, US.
Feng, Jinwei et al, "A broadband self-tuning active noise equaliser", Signal Processing, Elsevier Science Publishers B.V. Amsterdam, NL, vol. 62, No. 2, Oct. 1, 1997, pp. 251-256.
Zhang, Ming et al., "A Robust Online Secondary Path Modeling Method with Auxiliary Noise Power Scheduling Strategy and Norm Constraint Manipulation", IEEE Transactions on Speech and Audio Processing, IEEE Service Center, New York, NY, vol. 11, No. 1, Jan. 1, 2003.
Lopez-Gaudana, Edgar et al., "A hybrid active noise cancelling with secondary path modeling", 51st Midwest Symposium on Circuits and Systems, 2008, MWSCAS 2008, Aug. 10, 2008, pp. 277-280.
Widrow, B., et al., Adaptive Noice Cancelling; Principles and Applications, Proceedings of the IEEE, Dec. 1975, pp. 1692-1716, vol. 63, No. 13, IEEE, New York, NY, US.
Morgan, et al., A Delayless Subband Adaptive Filter Architecture, IEEE Transactions on Signal Processing, IEEE Service Center, Aug. 1995, pp. 1819-1829, vol. 43, No. 8, New York, NY, US.

\* cited by examiner

REDUCING AN ACOUSTIC INTENSITY VECTOR WITH ADAPTIVE NOISE CANCELLATION WITH TWO ERROR MICROPHONES

FIELD OF THE DISCLOSURE

The instant disclosure relates to mobile devices. More specifically, this disclosure relates to audio output of mobile devices.

BACKGROUND

Mobile devices are carried by a user throughout most or all of a day. During the day, the user may encounter many different environments, each with a different background noise characteristic and other acoustic effects. Mobile devices employ noise cancelling to take into account the environmental changes and improve the user's experience while using the mobile device. An adaptive noise cancelling (ANC) algorithm may generate an anti-noise signal to inject into a speaker output to improve the quality of audio produced by the speaker. However, the performance of noise cancelling systems vary with how closely a speaker of the mobile device is placed against the user's ear because the coupling between the user's ear and the speaker varies with distance.

Conventionally, an error microphone is included near the earpiece speaker of a mobile device. The error microphone measures audible signals at the earpiece to monitor the performance of the ANC algorithm. An ANC algorithm may incorporate input from the error microphone as feedback to adjust the ANC algorithm to improve cancellation of environmental noise. However, a single error microphone is only able to measure an acoustic pressure at the user's ear, which may be a misleading indicator of how an acoustic field generated by the speaker is behaving. In particular, the acoustic pressure measured by the error microphone is the acoustic pressure at the earpiece of the mobile device. The acoustic pressure at the earpiece is not necessarily the acoustic pressure at the user's ear drum, where the acoustic field is translated into perceptible noise for the user.

SUMMARY

A second error microphone may be placed near the speaker of a mobile device. For example, the second error microphone may be placed at the earpiece of a cellular phone. Both a first error microphone and the second error microphone may face the user's ear and be aligned in a parallel arrangement. Input signals from the first error microphone and the second error microphone may be input to an algorithm to determine an acoustic intensity vector at the location of the first error microphone. The acoustic intensity vector calculated from the input signals of the first and second error microphones is proportional to, or equal to, the acoustic intensity vector at the user's ear drum.

The acoustic intensity vector may be provided to an adaptive noise cancellation (ANC) algorithm to modify an anti-noise signal generated at an ANC circuit and produced at the speaker. The acoustic intensity vector may also be input to an algorithm to calculate an input impedance of the first and second error microphones. The input impedance may be used to determine when the mobile device is removed from the user's ear, and the ANC algorithm adjusted or disabled when an off-ear event is detected.

According to one embodiment, a method may include receiving a first signal from a first microphone of a mobile phone, the first microphone facing a user. The method may also include receiving a second signal from a second microphone of the mobile phone, the second microphone facing the user. The method may further include calculating a parameter proportional to acoustic particle velocity based, at least in part, on the first signal and the second signal.

The method may also include calculating an acoustic impedance based, at least in part, on the parameter proportional to the acoustic particle velocity; determining a pressure applied by the user between the user and the mobile phone based, at least in part, on the acoustic impedance; adjusting an active noise control algorithm based, at least in part, on the applied pressure; detecting when the mobile phone is removed from the user's ear; calculating an acoustic intensity vector at the first microphone, and adjusting the active noise control algorithm to reduce the acoustic intensity vector; and/or calculating a first acoustic pressure at the first microphone based on the first signal, and calculating a second acoustic pressure at the second microphone based on the second signal, in which the calculated parameter is based, at least in part, on the first acoustic pressure and the second acoustic pressure.

According to another embodiment, an apparatus may include a first error microphone facing a first direction. The apparatus may also include a second error microphone facing the first direction. The apparatus may further include a processor coupled to the first error microphone and the second error microphone. The processor may be configured to execute the steps comprising receiving a first signal from the first error microphone, receiving a second signal from the second error microphone, and calculating a parameter proportional to acoustic particle velocity based, at least in part, on the first signal and the second signal.

In certain embodiments, the first error microphone and the second error microphone are stacked and/or the processor may be a digital signal processor.

The processor of the apparatus may also be configured to execute the step of calculating an acoustic impedance based, at least in part, on the parameter proportional to the acoustic particle velocity; execute the step of determining a pressure applied by the user between the user and the apparatus based, at least in part, on the acoustic impedance; to execute the step of adjusting an active noise control algorithm based, at least in part, on the applied pressure; execute the step of detecting when the apparatus is removed from the user's ear; to execute the steps comprising calculating an acoustic intensity vector at the first microphone, and adjusting the active noise control algorithm to reduce the acoustic intensity vector; and/or to execute the steps of calculating a first acoustic pressure at the first microphone based, at least in part, on the first signal, and calculating a second acoustic pressure at the second microphone based, at least in part, on the second signal, in which the calculated parameter is based, at least in part, on the first acoustic pressure and the second acoustic pressure.

According to yet another embodiment, a computer program product may include a non-transitory computer readable medium comprising code to execute the steps comprising receiving a first signal from a first microphone facing a user, receiving a second signal from a second microphone facing the user, and calculating a parameter proportional to acoustic particle velocity based, at least in part, on the first signal and the second signal.

The medium may also include code to execute the steps comprising calculating an acoustic impedance based, at least in part, on the parameter proportional to the acoustic particle velocity, and determining a pressure applied by the user between the user and a mobile phone, based at least in part, on the acoustic impedance; code to execute the step of adjusting an active noise control algorithm based, at least in part, on the applied pressure; and/or code to execute the steps comprising calculating an acoustic intensity vector at the first microphone, and adjusting the active noise control algorithm to reduce the acoustic intensity vector.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
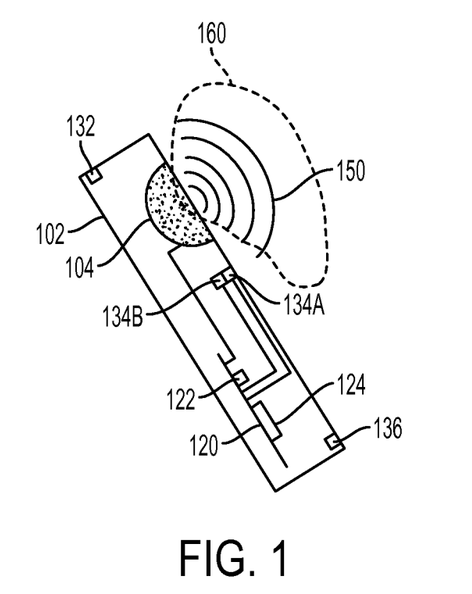
FIG. 1 is a cross-section illustrating a mobile device with two error microphones according to one embodiment of the disclosure.

FIG. 1 is a cross-section illustrating a mobile device with two error microphones according to one embodiment of the disclosure. A mobile device 102 may be placed near a user's ear 160. The mobile device 102 may be, for example, a mobile phone, a tablet computer, a laptop computer, or a wireless earpiece. The mobile device 102 may include a speaker 104, such as a transducer, driven by an amplifier 122 of a circuit 120. The speaker 104 may generate an acoustic sound field 150 near the mobile device 102. The user's ear 160 translates the acoustic sound field 150 into recognizable sounds for the user. For example, the acoustic sound field 150 may include speech conversations occurring during a phone call, playback of a voice mail message, playback of ring tones, and/or playback of audio or video files. The amplifier 122 may receive audio signals from a processor 124 of the circuit 120, such as a digital signal processor (DSP). The amplifier 122 amplifies the audio signals and drives the speaker 104 to generate the acoustic sound field 150.

The mobile device 102 may also include a near-speech microphone 136, an error microphone 134A, an error microphone 134B, and a reference microphone 132. Each of the microphones 132, 134A, 134B, and 136 receive audible sounds fields and translate the acoustic sound fields into electrical signals for processing by the circuit 120. For example, the near-speech microphone 136 may receive speech during a conversation occurring during a phone call. In another example, the error microphones 134A and 134B may receive the acoustic sound field 150 generated by the speaker 104. In a further example, the reference microphone 132 may be positioned away from a typical position of a user's mouth and may measure an ambient acoustic environment.

Figure 2:
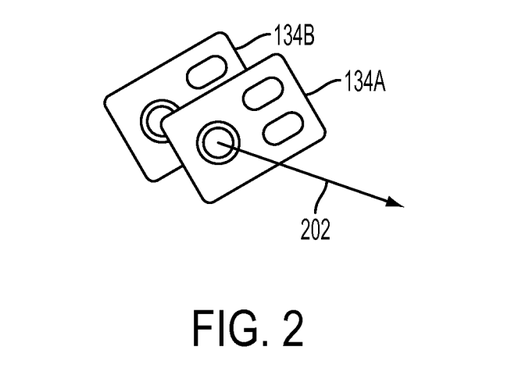
FIG. 2 is a block diagram illustrating a stacked component with two error microphones according to one embodiment of the disclosure.

FIG. 2 is a block diagram illustrating a stacked component with two error microphones according to one embodiment of the disclosure. The error microphones 134A and 134B may be stacked and oriented parallel to a common direction vector 202. The first error microphone 134A may measure a first acoustic pressure, P1, and the second error microphone 134B may measure a second acoustic pressure, P2. In one embodiment, the error microphones 134A and 134B may be components of a micro-electrical mechanical system (MEMS) system for detecting acoustic pressure.

Figure 3:
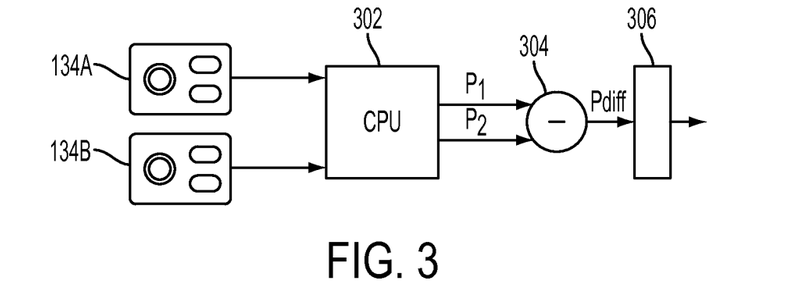
FIG. 3 is a block diagram illustrating a system for processing input signals from two error microphones according to one embodiment of the disclosure.

FIG. 3 is a block diagram illustrating a system for processing input signals from two error microphones according to one embodiment of the disclosure. The first error microphone 134A and the second error microphone 134B may provide input signals to a processor 302. The processor may compute the first acoustic pressure, P1, and the second acoustic pressure, P2, from the input signals of the error microphones 134A and 134B. The acoustic pressures, P1 and P2, may be provided to a subtractor 304, which calculates a difference between the pressures P1 and P2, which is proportional to an acoustic particle velocity of an acoustic field near the microphones 134A and 134B. The output of the subtractor 304, $P_{diff}$, may be scaled by a scaler 306, by multiplying the difference by a constant or a variable. The output of the scaler 306 may be provided to a processor for computing other variables and/or modifying an adaptive noise cancelling (ANC) algorithm. According to one embodiment, the functions of the components 302, 304, and 306 may be performed within a single device, such as a digital signal processor (DSP). Additionally, the single device may also perform calculations for the ANC algorithm.

Additional variables, such as acoustic intensity, may be calculated from the acoustic pressure values, P1 and P2. First, a mean pressure value, p, may be calculated from $$p = \frac{P_1 + P_2}{2}.$$

Then, an acoustic particle velocity vector may be calculated based on the acoustic pressure values, P1 and P2, and known positions of the error microphones 134A and 134B, $x_1$ and $x_2$, respectively, from $$\vec{v} = \frac{P_2 - P_1}{\vec{x_2} - \vec{x_1}}.$$

An acoustic impedance may be calculated based on the mean pressure, p, and the acoustic particle velocity, $\vec{v}$, from $$\vec{Z} = p/\vec{v}.$$

Additionally, an acoustic intensity vector may be calculated based on the mean pressure, p, and the acoustic particle velocity, $\vec{v}$, from $$\vec{I} = p * \vec{v}.$$

Figure 4:
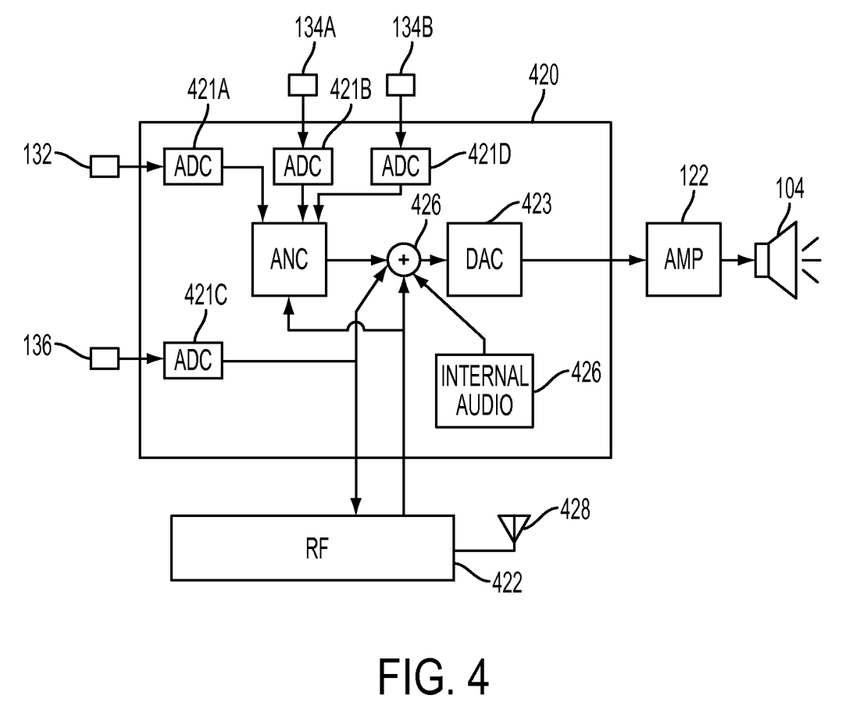
FIG. 4 is a block diagram illustrating a noise canceling system according to one embodiment of the disclosure.

Input signals from two error microphones may be provided to an adaptive noise cancellation (ANC) system for adapting the noise control system. FIG. 4 is a block diagram illustrating a noise canceling system according to one embodiment of the disclosure. A circuit 420 may receive input from the microphones 132, 134A, 134B, and 136. Analog values from the microphones 132, 134A, 134B, and 136 may be converted by analog-to-digital converters (ADCs) 421A, 421B, 421D, and 421C, respectively. The ADCs 421A, 412B, 421C, and 421D may be part of the noise control system or may be built into the microphones 132, 134A, 134B, and 136, respectively. In one embodiment, the microphones 132, 134A, 134B, and 136 are digital microphones, and no ADCs are placed between the digital microphones and the circuit 420.

The ANC circuit 430 may generate an anti-noise signal, which is provided to a combiner 426. The anti-noise signal may be adjusted according to a force, or distance, between the user's ear and the speaker 104. For example, the anti-noise signal may be disabled when the user removes the phone from the user's ear. The removal of the phone from the user's ear may be detected when the input impedance falls below a threshold value. The ANC circuit 430 may perform calculations based on input signals from the microphones 134A and 134B to determine variables, such as an acoustic intensity vector, an acoustic particle velocity, and/or an acoustic impedance, to determine an appropriate anti-noise signal.

The combiner 426 combines the anti-noise signal from the ANC circuit 430 with sound from the near speech microphone 136, internal audio 426, and audio signals received wirelessly through an antenna 428 and processed by a radio frequency (RF) circuit 422. The internal audio 426 may be, for example, ringtones, audio files, and/or audio portions of video files. Audio signals received through the antenna 428 may be, for example, streamed analog or digital audio signals and/or telephone conversations. The combiner 426 provides a single signal to a digital-to-analog converter (DAC) 423. The DAC 423 converts the digital signal of the combiner 423 to an analog audio signal for amplification by the amplifier 122 and output at the speaker 104.

Figure 5A:
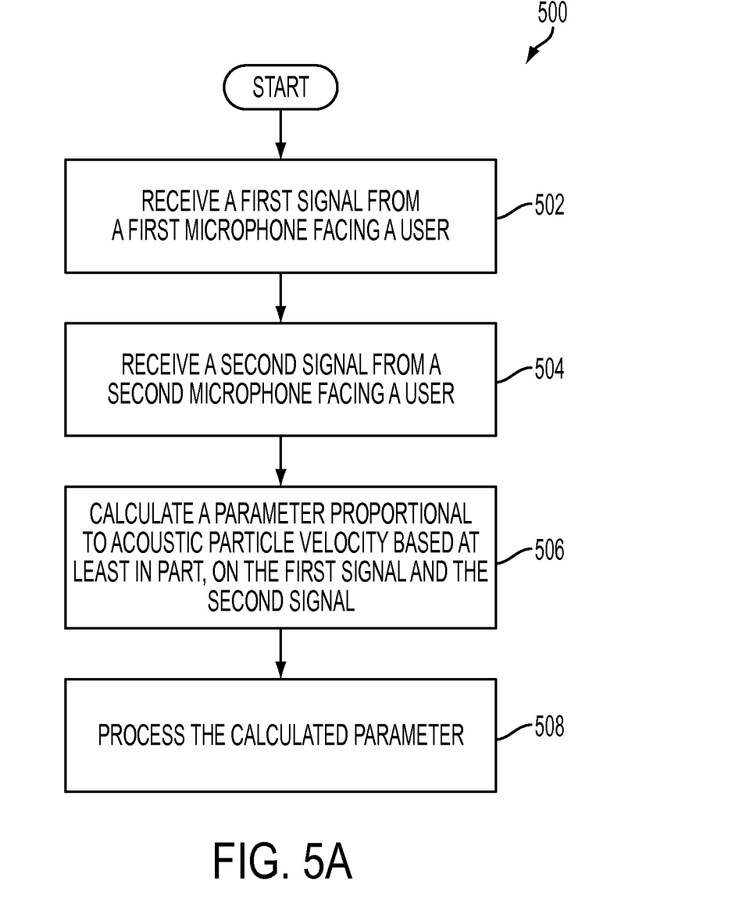
FIG. 5A is a flow chart illustrating a method for calculating acoustic particle velocity with two error microphones according to one embodiment of the disclosure.

The presence of two error microphones allows calculation of an acoustic particle velocity value. FIG. 5A is a flow chart illustrating a method for calculating acoustic particle velocity with two error microphones according to one embodiment of the disclosure. A method 500 begins at block 502 with receiving a first signal from a first microphone of a mobile device, such as a cellular phone, a tablet computer, a laptop computer, or a wireless headset, facing a user. At block 504, a second signal is received from a second microphone facing the user of the mobile device. The first and second signals of blocks 502 and 504 may be sampled simultaneously or sampled sequentially in a short time period.

At block 506, a parameter proportional to acoustic particle velocity may be calculated based, at least in part, on the first signal and the second signal. The parameter proportional to the acoustic particle velocity may be, for example, a relative acoustic particle velocity that is offset and/or scaled from the acoustic particle velocity. Calibration measurements may be performed to obtain data to calculate an actual acoustic particle velocity from the relative acoustic particle velocity. At block 508, the calculated parameter may be processed. For example, the calculated parameter may be processed to calculate an input impedance, to calculate an acoustic intensity vector, to calculate an anti-noise signal, and/or to determine when the mobile device is removed from the user's ear.

Figure 5B:
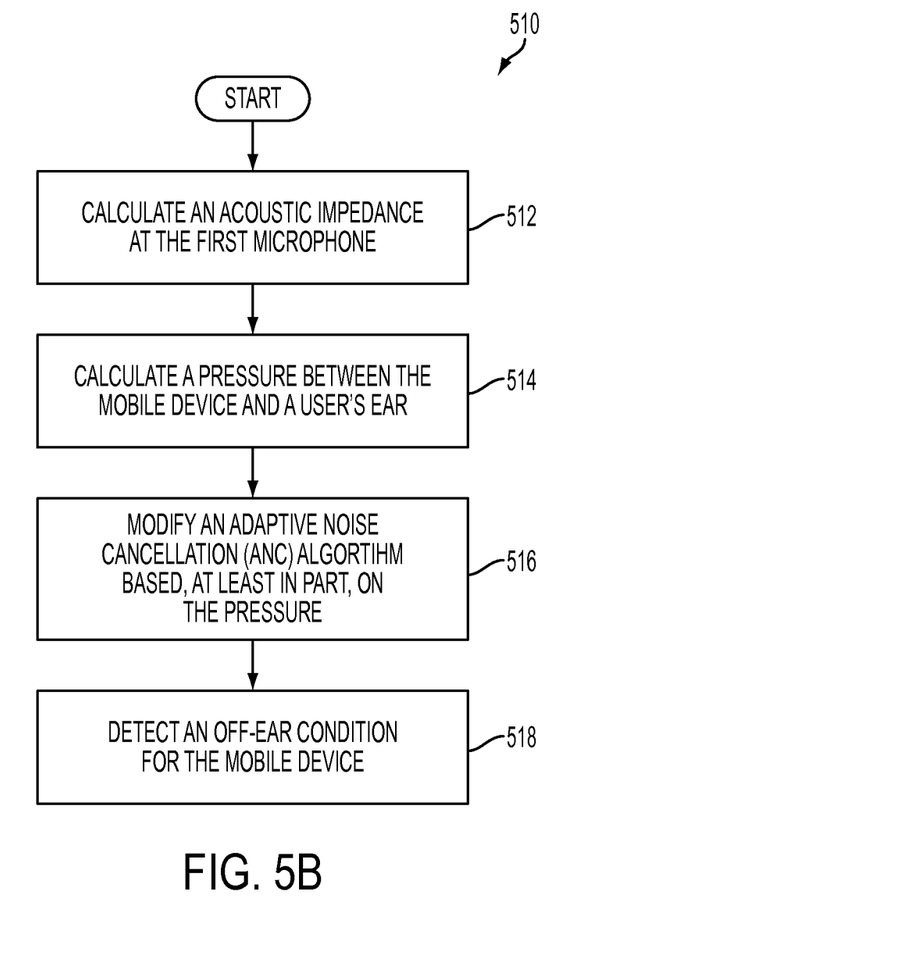
FIG. 5B is a flow chart illustrating a method for adaptive noise cancellation (ANC) in a mobile device by calculating acoustic impedance according to one embodiment of the disclosure.

Input signals from the microphones 134A and 134B may be used by an adaptive noise cancellation (ANC) algorithm. FIG. 5B is a flow chart illustrating a method for adaptive noise cancellation (ANC) in a mobile device by calculating acoustic impedance according to one embodiment of the disclosure. A method 510 begins at block 512 with calculating an acoustic impedance at the first microphone based, at least in part, on the first signal and the second signal of the first and second error microphones, respectively. At block 514, a pressure applied between the mobile device and the user's ear may be calculated. The applied pressure may indicate a degree of coupling between the speaker of the mobile device and the user's ear.

The applied pressure may be supplied to the adaptive noise cancellation (ANC) algorithm, at block 516, to modify the ANC algorithm based on the degree of coupling. At block 518, the applied pressure may be used to detect an off-ear condition for the mobile device, indicating the user has removed the mobile device from the user's ear. When an off-ear event is detected, the ANC algorithm may be adjusted to prevent undesired anti-noise from being generated at the speaker and heard by the user. In one embodiment, when an off-ear condition is detected at block 518, the ANC algorithm may be disabled.

Figure 5C:
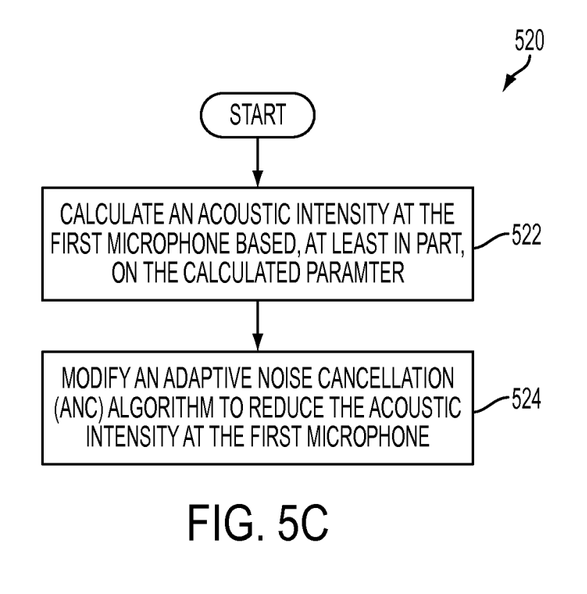
FIG. 5C is a flow chart illustrating a method for adaptive noise cancellation (ANC) in a mobile device by reducing acoustic intensity at an error microphone according to one embodiment of the disclosure.

The ANC algorithm may be improved by calculating an acoustic intensity vector from the first signal and the second signal of the first and second error microphones. FIG. 5C is a flow chart illustrating a method for adaptive noise cancellation (ANC) in a mobile device by reducing acoustic intensity at an error microphone according to one embodiment of the disclosure. A method 520 begins at block 522 with calculating an acoustic intensity at the first microphone based, at least in part, on the calculated parameter at block 506 of FIG. 5A, which is proportional to acoustic particle velocity. The acoustic intensity vector measured at the first error microphone may be proportional to or equal to the acoustic intensity vector at the user's ear. At block 524, an adaptive noise cancellation (ANC) algorithm may be adjusted to reduce the acoustic intensity vector at the first microphone. That is, an anti-noise signal may be generated by the ANC algorithm to minimize the acoustic intensity vector.

Figure 6:
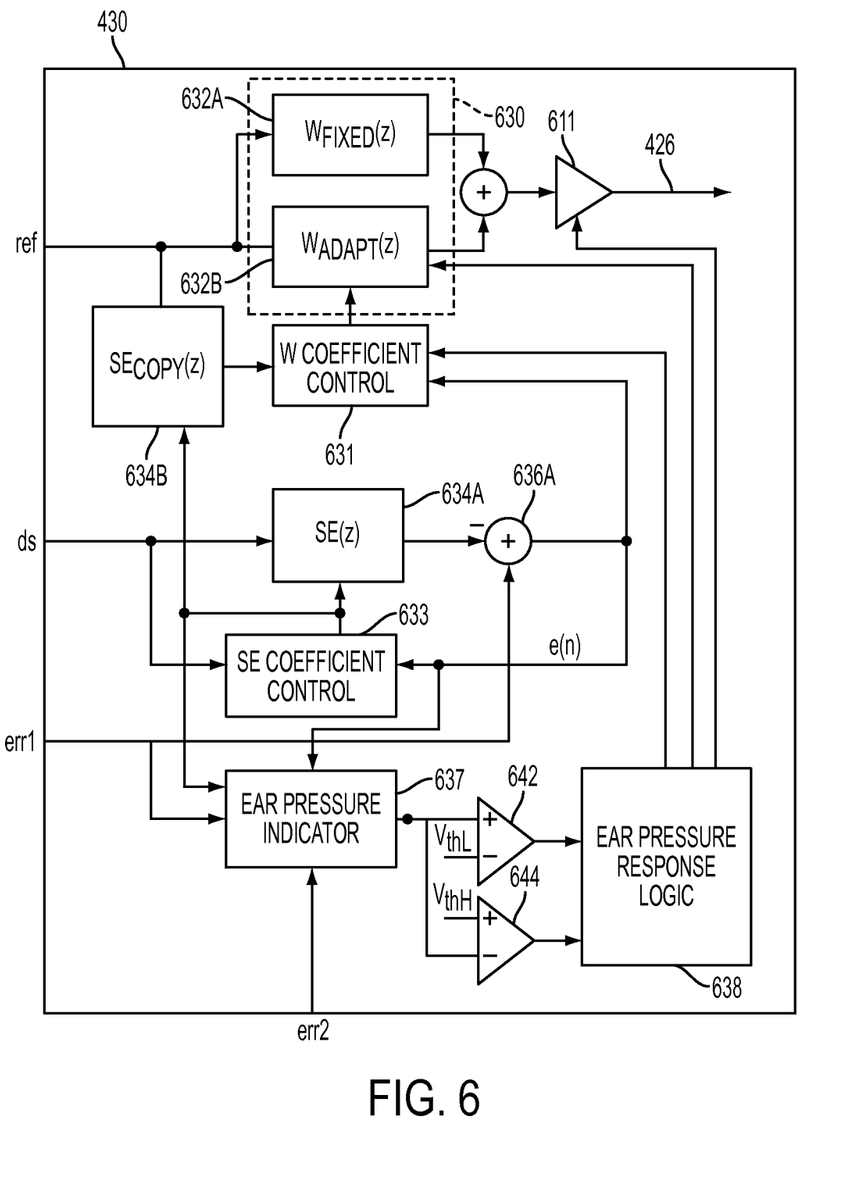
FIG. 6 is a block diagram of an adaptive noise cancellation (ANC) circuit according to one embodiment of the disclosure.

Additional details regarding the adaptive noise cancellation circuit are illustrated in FIG. 6. FIG. 6 is a block diagram of an adaptive noise cancellation circuit according to one embodiment of the disclosure. An adaptive filter 630 may be formed from a fixed filter 632A, having a response $W_{FIXED}(z)$, and an adaptive portion 632B, having a response $W_{ADAPT}(z)$ with outputs summed by a combiner 636B. The adaptive filter 630 may receive the reference microphone signal ref and may adapt a transfer function $W(z)=W_{FIXED}(z)+W_{ADAPT}(z)$ to generate an anti-noise signal, which is provided to the combiner 426 that combines the anti-noise signal with the audio to be reproduced by the speaker. The response of $W(z)$ adapts to estimate a ratio $P(z)/S(z)$, where $S(z)$ is a response for an electro-acoustic path and $P(z)$ is response for an acoustic path. A controllable amplifier circuit 611 mutes or attenuates the anti-noise signal under certain non-ideal conditions, such as when the anti-noise signal is expected to be ineffective or erroneous due to lack of a seal between the user's ear and mobile device.

The coefficients of adaptive filter 632B may be controlled by a W coefficient control block 631, which may use a correlation of two signals to determine the response of the adaptive filter 632B to reduce the energy of the error, such as calculated by a least-mean square function, between the components of the reference microphone signal ref that are present in the error microphone signal err1. The signals compared by the W coefficient control block 631 may be the reference microphone signal ref as shaped by a copy of an estimate $SE_{COPY}(z)$ of the response of path $S(z)$ provided by filter 634B and an error signal $e(n)$ formed by subtracting a modified portion of a downlink audio signal ds from the error microphone signal err1. By transforming the reference microphone signal ref with a copy of the estimate of the response of path $S(z)$, $SE_{COPY}(z)$, and adapting the adaptive filter 632B to reduce the correlation between the resultant signal and the error microphone signal err1, the adaptive filter 632B adapts to the desired response of $P(z)/S(z)-W_{FIXED}(z)$. Thus, response $W(z)$ adapts to $P(z)/S(z)$, resulting in a noise-cancelling error, which may be white noise.

The signal compared to the output of the filter 634B by the W coefficient control block 631 adds to the first error microphone signal err1 an inverted amount of the downlink audio signal ds that is processed by the filter response 634A, $SE(z)$, of which response $SE_{COPY}(z)$ is a copy. By injecting an inverted amount of the downlink audio signal ds, the adaptive filter 632B may be prevented from adapting to the relatively large amount of downlink audio present in the error microphone signal err1 and by transforming that inverted copy of the downlink audio signal ds with the estimate of the response of path $S(z)$. The downlink audio that is removed from the error microphone signal err1 before comparison may match the expected version of the downlink audio signal ds reproduced at the error microphone signal err1, because the electrical and acoustical path of $S(z)$ may be the path taken by the downlink audio signal ds to arrive at an error microphone. The filter 634B may have an adjustable response tuned to match the response of the adaptive filter 634A, such that the response of the filter 634B tracks the adapting of the adaptive filter 634A.

The adaptive filter 634A may include coefficients controlled by SE coefficient control block 633, which compares the downlink audio signal ds and the error microphone signal err1 after removal of the above-described filtered downlink audio signal ds that has been filtered by the adaptive filter 634A to represent the expected downlink audio delivered to an error microphone, and which has been removed from the output of the adaptive filter 634A by a combiner 636A. The SE coefficient control block 633 correlates the downlink speech signal ds with the components of downlink audio signal ds that are present in the error microphone signal err1. The adaptive filter 634A is adapted to generate a signal from the downlink audio signal ds, and optionally the anti-noise signal combined by the combiner 636B during muting conditions, that when subtracted from the error microphone signal err1, contains the content of error microphone signal err1 that is not due to the downlink audio signal ds. The overall energy of the error signal normalized to the overall energy of the response $SE(z)$ is related to the pressure between the user's ear and mobile device, which may be determined by calculating the input impedance described above with reference to FIGS. 5A-C.

In one embodiment, an ear pressure indicator 637 may determine the ratio between $E|e(N)|$, which is the energy of the error signal generated by the combiner 636A and an overall magnitude of the response of $SE(z)$: $\Sigma|SEn(z)|$. Ear pressure indication $E|e(n)|/\Sigma|SEn(z)|$ may be only one example function of $e(n)$ and $SE_n(z)$ that may be used to yield a measure of ear pressure. For example, $\Sigma|SE_n(z)|$ or $\Sigma SE_n(z)^2$, which are a function of only $SE(z)$, may be alternatively used because the response $SE(z)$ changes with ear pressure.

In another embodiment, the ear pressure indicator 637 may receive input signals from the first error microphone, err1, and the second error microphone, err2. The input signals err1 and err2 may be used by the ear pressure indicator 637 to calculate an input impedance and determine an ear pressure based, at least in part, on the input impedance. As described above with reference to FIG. 5B, the input impedance may be used to determine a force applied by the user between the mobile device and the user's ear. That force may be entered into an algorithm to determine ear pressure. The ear pressure indicator 637 may implement calculation of ear pressure based on the input impedance, the error signals, and/or response $SE(z)$.

The ear pressure indicator 637 may output a digital or analog value proportional to the force applied by the user between the mobile device and the user's ear. A comparator 642 compares the output of the ear pressure indicator 637 with a first, low pressure, threshold $V_{th,L}$. If the output is below the threshold, indicating that ear pressure is below the normal operating range, such as when the mobile device is off the user's ear, then the ear pressure response logic 638 may be signaled to take action to prevent generation of undesirable anti-noise at the user's ear. Similarly, a comparator 644 compares the output of the ear pressure indicator 637 with a second, high pressure, threshold $V_{th,H}$ and if $E|e(n)|/\Sigma|SEn(z)|$ is above the threshold, indicating that ear pressure is above the normal operating range, such as when the mobile device is pressed hard onto the user's ear, then the ear pressure response logic 638 may be signaled to take action to prevent generation of undesirable anti-noise at the user's ear.

Figure 7:
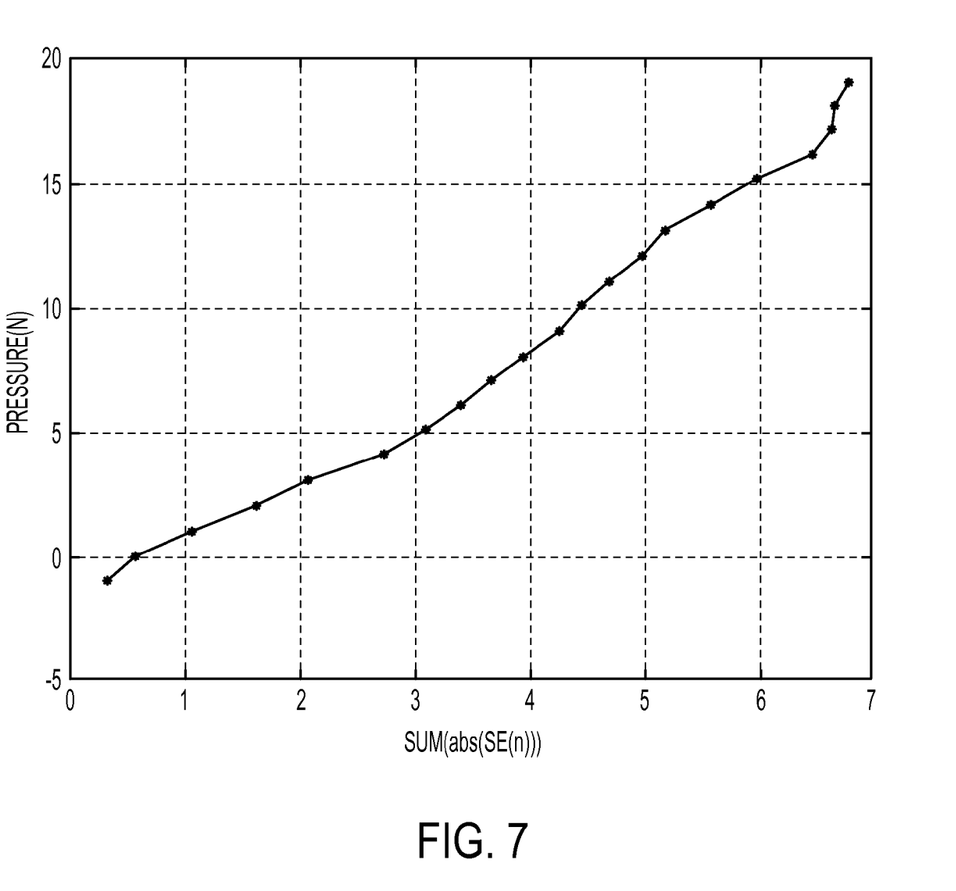
FIG. 7 is a graph of a response against pressure applied between the mobile device and the user's ear according to one embodiment of the disclosure.

FIG. 7 is a graph of a response against force between the mobile device and the user's ear according to one embodiment of the disclosure. As pressure increases between a mobile device and the user's ear, the response $SE(z)$ increases in magnitude, which indicates an improved electro-acoustic path $S(z)$, which is a measure of a degree of coupling between the speaker and the error microphone. A higher degree of coupling between the user's ear and the speaker is indicated when response $SE(z)$ increases in magnitude, and conversely, a lower degree of coupling between the user's ear and the speaker is indicated when response $SE(z)$ decreases in magnitude. Because the adaptive filter 632B of FIG. 6 adapts to the desired response of $P(z)/S(z)$, as ear pressure is increased and response $SE(z)$ increases in energy, less anti-noise is generated. Conversely, as the pressure between the ear and mobile device decreases, the anti-noise signal may increase in energy, because the user's ear is no longer highly coupled to the speaker and/or the error microphone.

Figure 8:
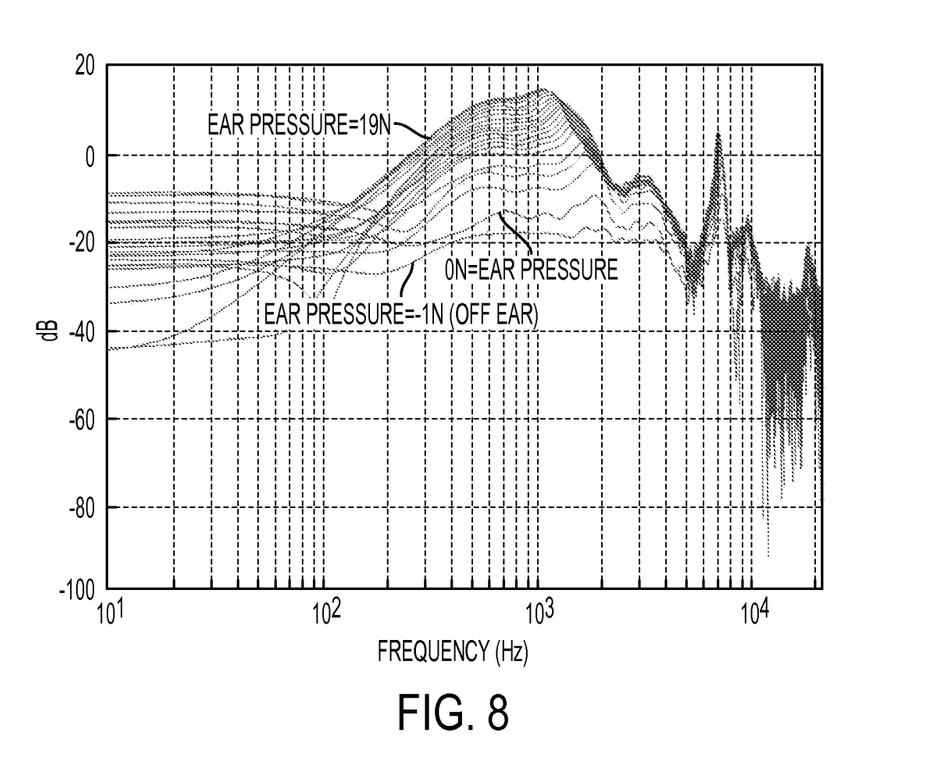
FIG. 8 is a graph of a response as a function of frequency for different levels of ear pressure according to one embodiment of the disclosure.

FIG. 8 is a graph of response SE(z) as a function of frequency for different levels of ear pressure according to one embodiment of the disclosure. As illustrated in FIG. 7, as the pressure is increased between the mobile device and the user's ear, the response SE(z) increases in magnitude in the middle frequency ranges of the graph, which correspond to frequencies at which most of the energy for speech is located. The graphs shown in FIGS. 7 and 8 may be determined for individual mobile device designs using either a computer model, or a mock-up of a simulated user's head that allows adjustment of contact pressure between the user's ear and mobile device, which may also have a measurement microphone in simulated ear canal.

In general, ANC operates properly when the user's ear is coupled to the speaker. Because the speaker may be able to only generate a certain output level, such as 80 dB sound pressure level (SPL) in a closed cavity, once the mobile device is no longer in contact with the user's ear, the anti-noise signal may be ineffective and muted. At high coupling between the user's ear and the mobile device, such as when a large force is applied between the mobile device and the user's ear, the higher-frequency energy, such as between 2 kHz and 5 kHz, may be attenuated, which may cause noise boost due to response W(z) not adapting to the attenuated condition of the higher frequencies. When the ear pressure is increased, the anti-noise signal may not be adapted to cancel energies at the higher frequencies. The response $W_{ADAPT}(z)$ may be reset to a predetermined value and adaptation of response $W_{ADAPT}(z)$ may be frozen, such as by holding the coefficients of response $W_{ADAPT}(z)$ at constant predetermined values. Alternatively, the overall level of the anti-noise signal may be attenuated, or a leakage of response $W_{ADAPT}(z)$ of the adaptive filter 632B may be increased. Leakage of response $W_{ADAPT}(z)$ of the adaptive filter 632B may be provided by having the coefficients of response $W_{ADAPT}(z)$ return to a flat frequency response or a fixed frequency response.

Referring back to FIG. 6, when the comparator 642 indicates that the degree of coupling between the user's ear and mobile device has been reduced below a first, low pressure, threshold, the ear pressure response logic 638 may stop adaptation of the W coefficient control 631, and the amplifier 611 may be disabled to mute the anti-noise signal. When the comparator 644 indicates that the coupling between the user's ear and the mobile device has increased above a second, high pressure, threshold, the ear pressure logic 638 may increase leakage of the W coefficient control 631 or reset response $W_{ADAPT}(z)$ and freeze adaptation of response $W_{ADAPT}(z)$.

Alternatively, the ear pressure indicator 637 may be a multi-valued or continuous indication of different ear pressure levels, and the actions above may be replaced by applying an attenuation factor to the anti-noise signal in conformity with the level of ear pressure, so that when the ear pressure passes out of the normal operating range, between the first threshold and the second threshold, the anti-noise signal level is also attenuated by lowering the gain of the amplifier 611.

In one embodiment, the response $W_{FIXED}(z)$ of the fixed filter 632A may be trained for high ear pressure. The adaptive response of the adaptive filter 632B, response $W_{ADAPT}(z)$, may then be allowed to vary with ear pressure changes, up to the point that contact with the ear is minimal, at which point the adapting of response W(z) may be halted and the anti-noise signal may be muted, or the pressure on the ear is over a high threshold, at which time response $W_{ADAPT}(z)$ may be reset and adaptation of response $W_{ADAPT}(z)$ may be frozen, or the leakage may be increased. Additional details regarding ANC operation are disclosed in U.S. patent application Ser. No. 13/310,380 entitled "Ear-Coupling Detection and Adjustment of Adaptive Response in Noise-Canceling in Personal Audio Devices," which is hereby incorporated by reference in its entirety.

Figure 9:
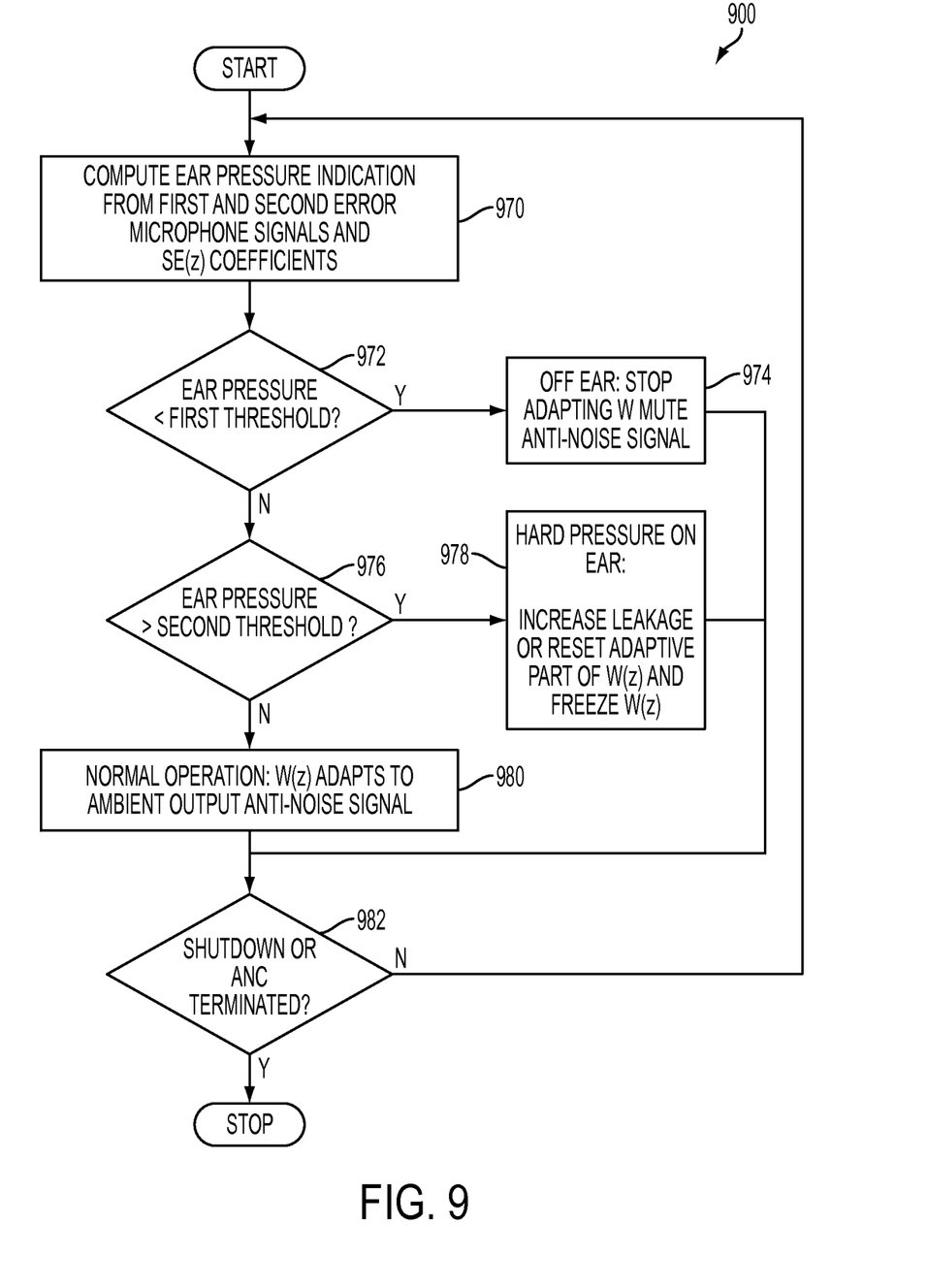
FIG. 9 is a flow chart illustrating a method for adapting adaptive noise cancellation algorithms based on ear pressure according to one embodiment of the disclosure.

FIG. 9 is a flow chart illustrating a method for adapting adaptive noise cancellation algorithms based on ear pressure according to one embodiment of the disclosure. A method 900 begins at block 970 with computing an ear pressure indication from at least one of the error microphone signal, the SE(z) coefficients, and/or the input impedance. At block 972, it is determined if the ear pressure is lower than a first threshold. If so. an off-ear event is detected, and the method 900 continues to block 974 to stop adapting response W(z) and/or mute the anti-noise signal. If not, the method 900 continues to block 976.

At block 976, it is determined whether the ear pressure is above a second threshold, higher than the first threshold. If so a hard-pressure event is detected, and the method 900 continues to block 978 to increase leakage of the response W(z) and/or reset and freeze the adaptive portion of response W(z). If not, then normal operation is continued at block 980, during which response W(z) adapts to the ambient audio environment and the anti-noise signal is output to the speaker.

At block 982, it is determined whether the ANC is terminated or the mobile device is shut down. If not, then the method 900 repeats, such as by returning to block 970 and repeating blocks 972 and/or 976. If the determination at block 982 is yes, then the method 900 terminates.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
 receiving a first signal from a first microphone, the first microphone facing a user;
 receiving a second signal from a second microphone, the second microphone facing the user;
 calculating a parameter proportional to acoustic particle velocity based, at least in part, on the first signal and the second signal;
 calculating an acoustic intensity vector based, at least in part, on the calculated parameter proportional to the acoustic particle velocity;
 adjusting an audio output signal for output to a transducer based, at least in part, on the calculated acoustic intensity vector, wherein the step of adjusting the audio output signal comprises adjusting an active noise control algorithm to reduce the acoustic intensity vector;
 calculating an acoustic impedance based, at least in part, on the calculated parameter proportional to the acoustic particle velocity; and
 disabling the active noise control algorithm when the determined acoustic impedance indicates the device is removed from the user's ear.

2. The method of claim 1, further comprising:
 determining a pressure applied between the device and the user's ear based, at least in part, on the calculated acoustic impedance;
 adjusting the active noise control algorithm based, at least in part, on the applied pressure.

3. The method of claim 2, further comprising detecting when the device is removed from the user's ear based, at least in part, on the determined pressure.

4. The method of claim 1, further comprising:
 calculating a first acoustic pressure at the first microphone based on the first signal; and
 calculating a second acoustic pressure at the second microphone based on the second signal,
 in which the calculated parameter is based, at least in part, on the first acoustic pressure and the second acoustic pressure.

5. An apparatus, comprising:
 a first error microphone facing a first direction;
 a second error microphone facing the first direction; and
 a transducer;
 a processor coupled to the first error microphone, coupled to the second error microphone, and coupled to the transducer, wherein the processor is configured to execute the steps comprising:
 receiving a first signal from the first error microphone;
 receiving a second signal from the second error microphone;
 calculating a parameter proportional to acoustic particle velocity based, at least in part, on the first signal and the second signal;
 calculating an acoustic intensity vector based, at least in part, on the calculated parameter proportional to the acoustic particle velocity;
 adjusting an audio output signal provided to the transducer based, at least in part, on the calculated acoustic impedance intensity vector, wherein the step of adjusting the audio output signal comprises adjusting an active noise control algorithm to reduce the acoustic intensity vector;
 calculating an acoustic impedance based, at least in part, on the calculated parameter proportional to the acoustic particle velocity; and
 disabling the active noise control algorithm when the determined acoustic impedance indicates the device is removed from a user's ear.

6. The apparatus of claim 5, in which the first error microphone and the second error microphone are stacked.

7. The apparatus of claim 5, in which the processor is further configured to execute a step of determining a pressure applied by a user between the user and the apparatus based, at least in part, on the acoustic impedance.

8. The apparatus of claim 7, in which the processor is further configured to execute a step of adjusting the active noise control algorithm based, at least in part, on the applied pressure.

9. The apparatus of claim 8, in which the processor is further configured to execute a step of detecting when the apparatus is removed from the user's ear based, at least in part, on the determined pressure.

10. The apparatus of claim 5, in which the processor is further configured to execute the steps comprising:
 calculating a first acoustic pressure at the first microphone based, at least in part, on the first signal; and
 calculating a second acoustic pressure at the second microphone based, at least in part, on the second signal,
 in which the calculated parameter is based, at least in part, on the first acoustic pressure and the second acoustic pressure.

11. The apparatus of claim 5, in which the processor is a digital signal processor.

12. A computer program product, comprising:
 a non-transitory computer readable medium comprising code to execute the steps comprising:
 receiving a first signal from a first microphone facing a user;
 receiving a second signal from a second microphone facing the user;
 calculating a parameter proportional to acoustic particle velocity based, at least in part, on the first signal and the second signal;
 calculating an acoustic intensity vector based, at least in part, on the parameter proportional to the acoustic particle velocity; and
 adjusting an audio output signal provided to a transducer based, at least in part, on the calculated acoustic intensity vector, wherein the step of adjusting the audio output signal comprises adjusting an active noise control algorithm to reduce the acoustic intensity vector;
 calculating an acoustic impedance based, at least in part, on the calculated parameter proportional to the acoustic particle velocity; and
 disabling the active noise control algorithm when the determined acoustic impedance indicates the device is removed from the user's ear.

13. The computer program product of claim 12, in which the medium further comprises code to execute the step of
 determining a pressure applied by a user between the user and a device containing the transducer, based at least in part, on the acoustic impedance.

14. The computer program product of claim 13, in which the medium further comprises code to execute the step of adjusting the active noise control algorithm based, at least in part, on the applied pressure.

15. An apparatus, comprising:
 a first input node configured to receive a first signal from a first error microphone;

a second input node configured to receive a second signal from a second error microphone;
an output node configured to output an audio output signal for output to a transducer;
a processor coupled to the first input node, to the second input node, and to the output node, wherein the processor is configured to execute the steps comprising:
calculating a parameter proportional to acoustic particle velocity based, at least in part, on the first signal and the second signal;
calculating an acoustic intensity vector based, at least in part, on the calculated parameter proportional to the acoustic particle velocity;
adjusting the audio output signal provided to the transducer based, at least in part, on the calculated acoustic intensity vector, wherein the step of adjusting the audio output signal comprises adjusting an active noise control algorithm to reduce the acoustic intensity vector;
calculating an acoustic impedance based, at least in part, on the calculated parameter proportional to the acoustic particle velocity; and
disabling the active noise control algorithm when the determined acoustic impedance indicates the device is removed from a user's ear.

16. The apparatus of claim 15, in which the processor is further configured to execute a step of determining a pressure applied by a user between the user and the apparatus based, at least in part, on the calculated acoustic impedance.

17. The apparatus of claim 16, in which the processor is further configured to execute a step of adjusting the active noise control algorithm based, at least in part, on the applied pressure.

18. The apparatus of claim 17, in which the processor is further configured to execute a step of detecting when the apparatus is removed from the user's ear based, at least in part, on the determined pressure.

19. The apparatus of claim 15, in which the processor is further configured to execute the steps comprising:
calculating a first acoustic pressure at the first microphone based, at least in part, on the first signal; and
calculating a second acoustic pressure at the second microphone based, at least in part, on the second signal,
in which the calculated parameter is based, at least in part, on the first acoustic pressure and the second acoustic pressure.

* * * * *